(12) United States Patent
Maounis

(10) Patent No.: US 7,949,585 B2
(45) Date of Patent: May 24, 2011

(54) METHOD AND SYSTEM FOR PROVIDING RISK TRANCHES IN AN INVESTMENT PRODUCT

(76) Inventor: Nicholas Matthew Maounis, Greenwich, CT (US)

( * ) Notice: Subject to any disclaimer, the term of this patent is extended or adjusted under 35 U.S.C. 154(b) by 534 days.

(21) Appl. No.: 12/002,047

(22) Filed: Dec. 14, 2007

(65) Prior Publication Data
US 2009/0157562 A1    Jun. 18, 2009

(51) Int. Cl.
*G06Q 40/00*    (2006.01)
(52) U.S. Cl. .............. 705/35; 705/36 R; 705/37; 705/38
(58) Field of Classification Search ............. 705/36
See application file for complete search history.

(56) References Cited

U.S. PATENT DOCUMENTS

| 6,321,212 | B1 | 11/2001 | Lange | |
|---|---|---|---|---|
| 7,225,153 | B2 | 5/2007 | Lange | |
| 2002/0174046 | A1* | 11/2002 | Mistretta | 705/36 |
| 2005/0216386 | A1 | 9/2005 | Klugman | |
| 2005/0273429 | A1 | 12/2005 | Deckoff | |
| 2006/0059074 | A1 | 3/2006 | Freund | |
| 2006/0080250 | A1 | 4/2006 | Hansen et al. | |
| 2006/0089895 | A1* | 4/2006 | Joye et al. | 705/35 |
| 2006/0173774 | A1 | 8/2006 | Frankel | |
| 2006/0212380 | A1* | 9/2006 | Williams et al. | 705/35 |
| 2006/0235783 | A1* | 10/2006 | Ryles et al. | 705/35 |
| 2007/0033120 | A1 | 2/2007 | Sparaggis et al. | |
| 2007/0208644 | A1 | 9/2007 | Deckoff | |
| 2008/0154789 | A1* | 6/2008 | Lai et al. | 705/36 R |

OTHER PUBLICATIONS

Jeffrey, Christopher, "Preparing for pressure," posted by the dismal spectator, Saturday, May 21, 2005, 6 pages.
Pennock, David M., "A Dynamic Pari-Mutuel Market for Hedging, Wagering, and Information Aggregation," EC'04, May 17-20, 2004, New York, 10 pages.
"Hypothetical Examples," JPMorgan, JPMorgan Chase & Co., 2007, 4 pages. http://www.jpmorgan.com/pages/jpmorgan/investbk/solutions/si/notes/ex.
"Structured Deposits," Barclays Wealth 2007, 1 page, http://www.barclays.com/internationalpersonal/ib_12_3_structured.htm.
"Structured Investments," Morgan Stanlay 2007, 3 pages http://www.morganstanleyindividual.com/investmentproducts/StructuredInvestments/Types/.
"Combi Save Account," NatWest, 1 page, http://www.natwestinternational.com/international02a.asp?id=INTERNATIONAL/SAVE_AND_INVEST/STRUCTURED_DEPOSITS/COMBI, accessed Dec. 14, 2007.
"Conquering The Financial Summit With Creative Structured Deposits," Standard Chartered, Singapore, 2006, 4 pages, http://www.standardchartered.com.sg/cb/pfc/hm_conqueringsummit.html.
"Structured Deposits," DBS Group, DBS Bank Ltd., 2007, 1 page, http://www.dbs.com/sg/personal/investments/structured/.
"Structured Investments," Lloyds TSB Corporate Markets, Scotland, 1 page, http://www.lloydstsbcorporatemarkets.com/corporateservices/structuredinvestments.asp, accessed Dec. 14, 2007.

* cited by examiner

*Primary Examiner* — James P Trammell
*Assistant Examiner* — Behrang Badii
(74) *Attorney, Agent, or Firm* — Kenyon & Kenyon LLP

(57) ABSTRACT

A method and system for investing in an investment fund by at least one investor are provided. The method includes defining at least two tranches of the investment fund, each tranche associated with a tranche risk profile. The method includes, for each investor, receiving an investment amount in each tranche. The method includes calculating a profit/loss for each investor based on the investment amounts, the tranche risk profiles and a performance of the investment fund.

26 Claims, 9 Drawing Sheets

| | 102 Fund return | 104 Tranche A ret | 106 Tranche B ret | 108 Investor 1 $ P/L | 110 Investor 2 $ P/L |
|---|---|---|---|---|---|
| 112 | 40% | 58% | 38% | $4,800,000 | $4,200,000 |
| 114 | 30% | 48% | 28% | $3,800,000 | $3,200,000 |
| 116 | 5% | 23% | 3% | $1,300,000 | $700,000 |
| 118 | 2% | 20% | 0 | $1,000,000 | $400,000 |
| 120 | -5% | -50% | 0% | -$2,500,000 | -$1,000,000 |
| 122 | -10% | -100% | 0% | -$5,000,000 | -$2,000,000 |
| 124 | -30% | -100% | -22.22% | -$6,111,111 | -$3,777,777 |

100

| | 202 | 204 | 206 | 208 | 210 |
|---|---|---|---|---|---|
| Final Return | −20% | −10% | +2% | +30% |
| Long $10 M Final Val | $8 M | $9M | $10.2M | $13M |
| Long $100M Put @ 90 Final Val | $10M | 0 | 0 | 0 |
| Short $90 M Put @ 100 Final Val | −$18 M | −$9M | 0 | 0 |
| Short $90 M Call @ 102 Final Val | 0 | 0 | 0 | −$25.2M |
| Long $90 M Call @ 100 Final Val | 0 | 0 | $1.8M | $27M |
| Total Final Value | 0 | 0 | $12M | $14.8M |

Figure 2A

| 300 | 302 | 304 | 306 | | | | | | % Return By Tranche at end of term, based on underlying return | | | | | | | |
|---|---|---|---|---|---|---|---|---|---|---|---|---|---|---|---|---|
| Tranche A | Tranche B | Tranche A Down Det. Pt. % | Tranche A Priority Det. Pt. % | Underlying | 320 | 322 | 324 | 326 | 328 | 330 | 332 | 334 | 336 | 338 | 340 | 342 | 344 |
| Capital | Capital | | | return → | 40% | 30% | 15% | 10% | 5% | 2% | 0% | -2% | -5% | -10% | -20% | -30% | -40% |
| 308 $10 | $90 | 10.00% | 2.00% | A tranche | 58.00% | 48.00% | 33.00% | 28.00% | 23.00% | 20.00% | 0.00% | -20.00% | -50.00% | -100.00% | -100.00% | -100.00% | -100.00% |
| | | | | B tranche | 38.00% | 28.00% | 13.00% | 8.00% | 3.00% | 0.00% | 0.00% | 0.00% | 0.00% | 0.00% | -11.11% | -22.22% | -33.33% |
| 310 $20 | $80 | 20.00% | 2.55% | A tranche | 50.21% | 40.21% | 25.21% | 20.21% | 15.21% | 10.00% | 0.00% | -10.00% | -25.00% | -50.00% | -100.00% | -100.00% | -100.00% |
| | | | | B tranche | 37.45% | 27.45% | 12.45% | 7.45% | 2.45% | 0.00% | 0.00% | 0.00% | 0.00% | 0.00% | 0.00% | -12.50% | -25.00% |
| 312 $5 | $95 | 5.00% | 1.24% | A tranche | 63.62% | 53.62% | 38.62% | 33.62% | 28.62% | 25.62% | 0.00% | -40.00% | -100.00% | -100.00% | -100.00% | -100.00% | -100.00% |
| | | | | B tranche | 38.76% | 28.76% | 13.76% | 8.76% | 3.76% | 0.76% | 0.00% | 0.00% | 0.00% | -5.26% | -15.79% | -26.32% | -36.84% |
| 314 $30 | $70 | 30.00% | 2.62% | 342 A tranche | 46.12% | 36.12% | 21.12% | 16.12% | 11.12% | 6.67% | 0.00% | -6.67% | -16.67% | -33.33% | -66.67% | -100.00% | -100.00% |
| | | | | 344 B tranche | 37.38% | 27.38% | 12.38% | 7.38% | 2.38% | 0.00% | 0.00% | 0.00% | 0.00% | 0.00% | 0.00% | 0.00% | -14.29% |
| 316 $30 | $70 | 15.00% | 2.34% | A tranche | 45.46% | 35.46% | 20.46% | 15.46% | 10.46% | 6.67% | 0.00% | -6.67% | -16.67% | -33.33% | -50.00% | -50.00% | -50.00% |
| | | | | B tranche | 37.66% | 27.66% | 12.66% | 7.66% | 2.66% | 0.00% | 0.00% | 0.00% | 0.00% | 0.00% | -7.14% | -21.43% | -35.71% |
| 318 $10 | $90 | 5.00% | 1.17% | A tranche | 50.51% | 40.51% | 25.51% | 20.51% | 15.51% | 12.51% | 0.00% | -20.00% | -50.00% | -50.00% | -50.00% | -50.00% | -50.00% |
| | | | | B tranche | 38.83% | 28.83% | 13.83% | 8.83% | 3.83% | 0.83% | 0.00% | 0.00% | 0.00% | -5.56% | -16.67% | -27.78% | -38.89% |

Figure 3

| | 500 | 502 | 504 | 505 | 506 | | | | | | % Return By Tranche at end of term, based on underlying return | | | | | | | |
|---|---|---|---|---|---|---|---|---|---|---|---|---|---|---|---|---|---|---|
| | Tranche A | Tranche B | Tranche A | Initial Cash | Tranche A | | 520 | 522 | 524 | 526 | 528 | 530 | 532 | 534 | 536 | 538 | 540 | 542 |
| | Capital | Capital | Down Det. Pt. % | from B to A | Priority Det. Pt. % | Underlying return → | 40% | 30% | 15% | 10% | 5% | 2% | 0% | -2% | -5% | -10% | -20% | -30% |
| 508 | $10 | $90 | 10.00% | $0.50 | 1.14% | A tranche | 58.17% | 47.64% | 31.85% | 26.59% | 21.33% | 18.17% | 5.26% | -15.79% | 47.37% | -100.00% | -100.00% | -100.00% |
| | | | | | | B tranche | 38.09% | 28.15% | 13.23% | 8.26% | 3.29% | 0.30% | -0.55% | -0.55% | -0.55% | -0.55% | -11.60% | -22.65% |
| 510 | $20 | $80 | 20.00% | $0.20 | 2.16% | A tranche | 50.12% | 40.02% | 24.87% | 19.82% | 14.77% | 11.11% | 1.01% | -9.09% | -24.24% | -49.49% | -100.00% | -100.00% |
| | | | | | | B tranche | 37.50% | 27.53% | 12.56% | 7.58% | 2.59% | -0.25% | -0.25% | -0.25% | -0.25% | -0.25% | -0.25% | -12.72% |
| 512 | $5 | $95 | 5.00% | $0.30 | 76.00% | A tranche | 64.36% | 53.72% | 37.76% | 32.44% | 27.12% | 23.93% | 6.38% | -36.17% | -100.00% | -100.00% | -100.00% | -100.00% |
| | | | | | | B tranche | 38.80% | 28.83% | 13.88% | 8.89% | 3.91% | 0.92% | -0.31% | -0.31% | -0.31% | -5.56% | -16.05% | -26.55% |
| 514 | $30 | $70 | 30.00% | -$0.20 | 3.08% | A tranche | 46.22% | 36.29% | 21.39% | 16.42% | 11.45% | 5.96% | -0.66% | -7.28% | -17.22% | -33.77% | -66.89% | -100.00% |
| | | | | | | B tranche | 37.31% | 27.28% | 12.24% | 7.22% | 2.21% | 0.29% | 0.29% | 0.29% | 0.29% | 0.29% | 0.29% | 0.29% |
| 516 | $30 | $70 | 15.00% | -$0.05 | 2.23% | A tranche | 44.95% | 34.97% | 19.99% | 15.00% | 10.01% | 6.49% | -0.17% | -6.82% | -16.81% | -33.44% | -50.08% | -50.08% |
| | | | | | | B tranche | 37.87% | 27.87% | 12.86% | 7.85% | 2.85% | 0.07% | 0.07% | 0.07% | 0.07% | 0.07% | -7.08% | -21.37% |
| 518 | $10 | $90 | 5.00% | $0.10 | 1.00% | A tranche | 50.49% | 40.39% | 25.24% | 20.19% | 15.14% | 12.11% | 1.01% | -19.19% | 49.49% | 49.49% | 49.49% | 49.49% |

Figure 5

METHOD AND SYSTEM FOR PROVIDING RISK TRANCHES IN AN INVESTMENT PRODUCT

BACKGROUND

An investment fund is a form of collective investment of money pooled from many investors in stocks, bonds, and other securities or assets. A fund manager manages the fund and trades the fund's underlying securities, realizing capital gains or losses, and collects any dividend or interest income. Investment proceeds may then be passed along to the individual investors. Example investment funds include mutual funds and hedge funds. An investment fund may be associated with specific trading or investment strategies or a specific geographical area.

Structured investment products are synthetic investment instruments created to meet specific financial needs. A structured product is generally a pre-packaged investment strategy based on derivatives, for example, options and swaps, and may include protection of principal if held to maturity. In addition, the structured product may also provide a return based on a pre-determined formula. For example, a structured investment product may provide a return equal to a pre-determined index and up to a maximum limit, while the principal is protected.

Tranches refers to one of several related securities offered as part of the same deal. Tranches may be referred to as "classes" of investments identified by letter (e.g., the Class A, Class B, and Class C securities). The underlying investment(s) of the tranches is also referred to herein as a "reference portfolio."

All the tranches together make up the deal's capital structure. Returns are generally paid sequentially from the most senior (usually Senior Secured) to most subordinate (usually unsecured). A return of the reference portfolio at which a tranche becomes exposed to profit or loss on the investment is referred to herein as "attachment," and a return of the reference portfolio at which a tranche becomes disconnected from profit or loss on the investment is referred to herein as "detachment."

SUMMARY

Embodiments of the present invention provide an investment product to investors that is advantageous in that it allows the investors to customize the investors' risk profiles. Example embodiments of the present invention provide a system and a method that allocates investments in an investment fund, such as a hedge fund. The investment in the fund may include investments of two or more tranches, each tranche associated with a respective tranche risk profile. The tranche risk profiles define how profits and losses of the investment assets are to be divided among the tranches.

At least two of the tranches are available to investors, and an investor may invest in one or more of the tranches to create a customized risk/reward profile blending the tranche risk profiles of selected tranches. In addition, the investors may also directly invest in the fund without the tranche structure.

An example embodiment of the present invention may provide an investment method. The method may include defining a plurality of tranches having different risk profiles with respect to a same investment fund; receiving from an investor an investment amount; and allocating to each of at least two of the plurality of tranches a respective portion of the investment amount.

The method may include calculating a profit/loss for the investor based on the investment amount positions, the tranche risk profiles of the at least two tranches, and a performance of the investment fund. The method may include calculating a return as the profit/loss for the investor at an end of a predetermined period.

Each tranche risk profile may include one or more upside attachment segments or attachment points, an upside participation percentage, a downside attachment segment or attachment point, and a downside participation percentage. An attachment segment is a set of two distinct points including an attachment point and detachment point to the underlying investment return. Participation percentage refers to a specified percentage of the total underlying investment to which a tranche may be exposed for each point of attachment to the underlying investment. Two distinct exemplary types of tranches include a secured tranche, associated with a pro rata upside attachment point and a downside attachment point, and an unsecured tranche, associated with a priority upside attachment segment, a pro rata upside attachment point, and a priority downside attachment segment. A pro rata attachment point is defined as an attachment point where the participation percentage is proportional to that tranche's investment capital divided by the sum of the secured tranche capital plus the unsecured tranche capital. A priority attachment segment is defined as an attachment segment for an unsecured tranche where the participation share of the underlying investment return (profit or loss) is greater than the pro rata percentage of investment capital of the unsecured tranche.

A loss in the investment fund may be first allocated to a higher downside attachment point of an unsecured tranche and a profit in the investment fund may be first allocated to a lower priority upside attachment point of the unsecured tranche.

An allocation of loss to a tranche may be limited to the tranche's downside detachment point.

A loss in the investment fund may be allocated between the tranches based on each tranche's downside attachment point and percentage and a profit in the investment fund may be allocated based on each tranche's upside attachment point and percentage.

The tranches may be priced as an equivalent portfolio of a set of options.

The method may include calculating an initial value associated with each tranche based on each respective tranche risk profile.

The method may include selecting an investment amount in each tranche, where an aggregate investment amount in all the tranches provides a customized risk/reward profile requested by the investor.

The method may include, responsive to an investor purchase during an illiquid period, reallocating an investment in a tranche from a first investor to a second investor.

An example embodiment of the present invention may provide an investment method that may include selling shares of each of a plurality of tranches having different assigned risk profiles; for each of the plurality of tranches, receiving for the sale of its shares a respective monetary sum; investing a total of the monetary sums as a single investment in at least one investment fund; and allocating a profit or a loss resulting from the investment in the at least one fund to the plurality of tranches in accordance with the assigned risk profiles and in a manner disproportionate to respective percentages of the total to which the respective monetary sums correspond.

The investment method may further provide for calculating initial values of the shares based on a set of European-style call and put options that is equivalent to the plurality of tranches. The shares may be sold in accordance with the calculated values.

An example embodiment of the present invention may provide a computer system controlling investments in an investment fund by an investor. The system may include a memory and a processor. The memory may be configured to store: data representing a plurality of tranche risk profiles of a respective plurality of tranches, each associated with a same investment fund; and for an investor, at least two records, each record (a) indicating a respective position of an investment amount of the investor and (b) associated with a respective one of the plurality of tranche risk profiles. The processor may be configured to calculate a profit/loss for the investor based on the investment amount positions, the tranche risk profiles, and a performance of the investment fund.

A return may be calculated as the profit/loss for the investor at an end of a predetermined period. Each tranche risk profile may include an upside attachment point, an upside detachment point, an upside participation percentage, a downside attachment point, a downside detachment point, and a downside participation percentage.

A loss in the investment fund may be first allocated to a downside attachment point of an unsecured tranche and a profit in the investment fund may be first allocated to a priority upside attachment point of the unsecured tranche.

A loss of a tranche may be limited to the tranche's downside detachment point.

A loss in the investment fund may be allocated between the tranches based on each tranche's downside percentage and a profit in the investment fund may be allocated based on each tranche's upside participation percentage.

The tranches may be priced as a equivalent portfolio consisting of a set of options.

The processor may be further configured to calculate an initial value associated with each tranche based on the tranche risk profile of the respective tranche.

The processor may be further configured to select an investment amount in each tranche, where an aggregate investment amount in all the tranches provides a customized risk/reward profile requested by the investor.

An example embodiment of the present invention may provide a computer-readable medium having stored thereon instructions adapted to be executed by a processor. The instructions, when executed, may cause the processor to perform an investment method. The method may include: storing definitions of a plurality of tranches having different risk profiles with respect to a same investment fund, the definitions defining the different risk profiles; allocating to each of at least two of the plurality of tranches a respective portion of an investment amount of an investor; and calculating a profit/loss for the investor based on the investment amount portions, the risk profiles defined by the respective definitions of the at least two tranches, and a performance of the investment fund.

The method may further include calculating a return as the profit/loss for each investor who invests in the one or more of the tranches at the end of a predetermined period.

Each tranche risk profile may include a upside attachment point, an upside detachment point, an upside percentage, a downside attachment point, a downside detachment point, and a downside percentage.

A loss in the investment fund may be first allocated to a higher priority downside attachment point tranche and a profit in the investment fund may be first allocated to a higher priority upside attachment point tranche.

A loss of a tranche may be limited to the tranche's downside detachment point.

A loss in the investment fund may be allocated between the tranches based on each tranche's downside participation percentage and a profit in the investment fund may be allocated between the tranches based on each tranche's upside participation percentage.

The tranches may be priced as an equivalent portfolio of a set of options.

The tranches may be priced in an auction.

The method may further include calculating an initial value associated with each tranche based on the respective tranche risk profiles.

The method may further include selecting an investment amount in each tranche, where an aggregate investment amount in all the tranches provides a customized risk/reward profile requested by the investor.

The method may further include, responsive to an investor purchase, reallocating an investment in a tranche from a first investor to a second investor, where the reallocation occurs during an illiquid period.

BRIEF DESCRIPTION OF THE DRAWINGS

FIG. 2A is a table that shows possible returns of a first tranche of an investment asset, according to an example embodiment of the present invention.

FIG. 3 is a table that shows possible returns of tranches with various risk profiles, according to an example embodiment of the present invention.

FIG. 5 is a table that shows possible returns of tranches with various risk profiles where initial cash is paid by one tranche to another tranche, according to an example embodiment of the present invention.

DETAILED DESCRIPTION

Figure 1:
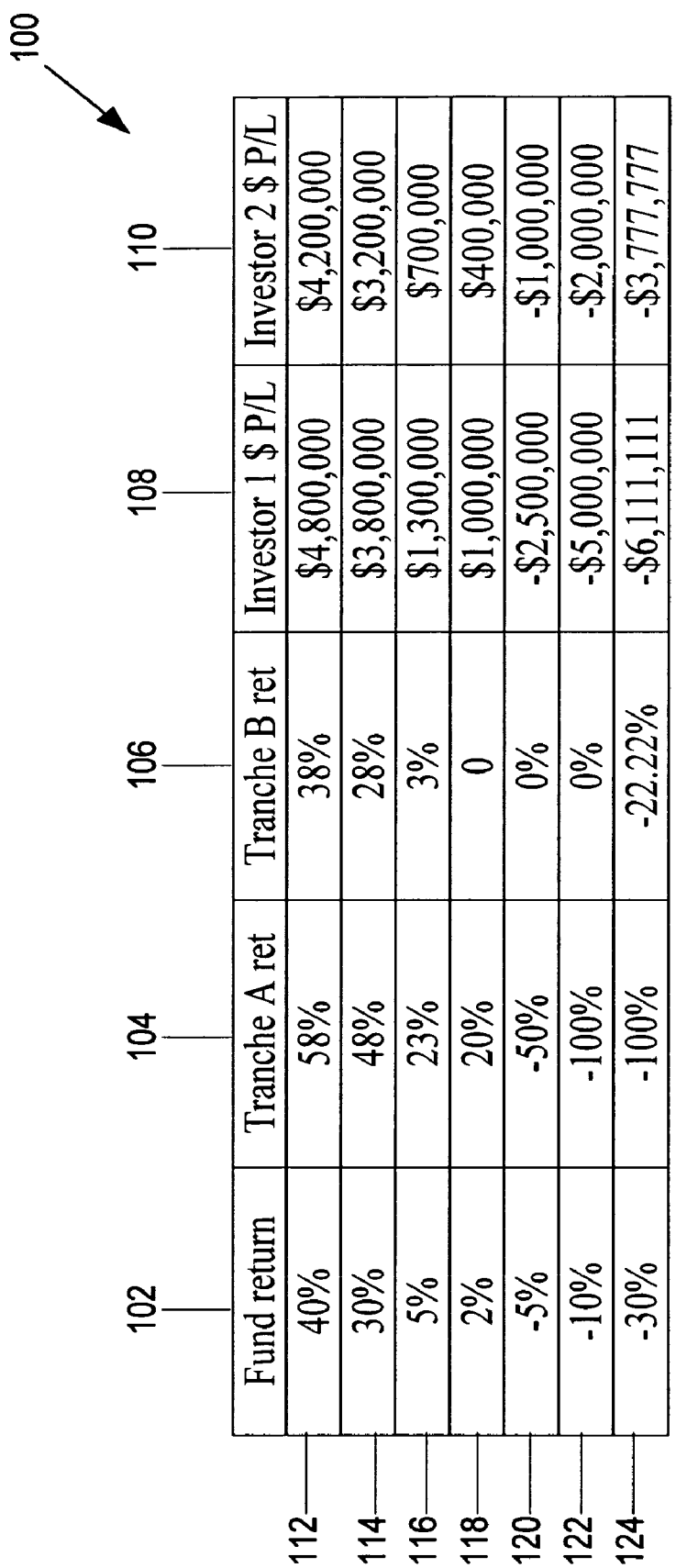
FIG. 1 is a table that shows possible returns of two tranches of an investment asset, according to an example embodiment of the present invention.

FIG. 1 illustrates possible returns of two tranches of an investment asset according to an embodiment of the present invention. An investment fund, for example, a hedge fund, may be divided into two tranches, A and B, each associated with a respective risk profile. Tranche A may, for example, include $10 million of investment capital, and represent the riskiest tranche (junior or unsecured tranche). Tranche B may, for example, include $90 million of investment capital and represent a less risky tranche (senior secured tranche). The investment capital may be received from investors seeking to invest in the hedge fund and the investment capital amounts may be dependent upon amounts investors choose to invest in the respective tranches. The investors may allocate their capital between tranche A and tranche B of the hedge fund. The fund may have a lock-up period, for example, two years, at the end of which the fund's return is calculated and capital returned to the investors.

For example, the risk profile of tranche A may be as follows: tranche A receives 100% of all returns (if any) on the $100 million investment in the hedge fund at end of the 2 year term period, up to a maximum of $2 million. If returns in the hedge fund are greater than $2 million, tranche A receives additional returns based on its pro rata share of the investment capital, i.e., 10%. If, at the end of the 2 year term, the returns are negative, tranche A loses up to 100% of the $10 million investment. Thus, tranche A will enjoy the profits and suffer the losses of the investment fund before tranche B.

Tranche B investors get a pro rata share, i.e., 90%, of any returns from the fund that exceeds $2 million. If the fund suffers a loss, tranche B investors are initially protected by the $10 million capital of tranche A. Therefore, tranche B only suffers losses if the fund losses exceed $10 million. It can be seen that tranche A is more risky but has a higher potential return, while tranche B is less risky but has a lower potential return.

Accordingly, tranche A has an upside attachment point starting at 0 total return, and receives 100% participation of the total underlying returns up to 2% total return, which is the priority upside detachment point. Above this, tranche A has a pro-rata attachment point at 2%, with a pro-rata participation of 10%. On the downside, tranche A has a priority downside participation of 100% on the segment from the downside attachment point at 0% total return to the downside detachment point of 10%.

Tranche B has an upside pro-rata (90% participation) attachment point starting at 2% total return, a downside detachment point at 0% total return, and a downside attachment point of 100% at 10% loss and below.

An investor might place some capital in tranche A and some in tranche B. The investor may also invest directly in the underlying investment fund. Thus, investors are able to tailor a customized risk/reward profile.

Table 100 depicts example payouts for investor 1 and investor 2, each of whom invests in a hedge fund with tranches A and B as discussed above. Investor 1 places $5 million in tranche A and $5 million in tranche B. Investor 2 places $2 million in tranche A and $8 million in Tranche B.

Column 102 lists example returns of the fund. Column 104 lists the corresponding return of tranche A, while column 106 lists the corresponding return of tranche B. Column 108 lists investor A's profit/loss and column 110 lists investor B's profit/loss.

Rows 112, 114, 116, 118, 118, 120, 122, and 124 list example returns of the fund and the corresponding values in the remaining columns. For example, row 112 depicts that if the fund returns 40% ($40 million on the $100 million of tranches A and B collectively), tranche A's return is 58%. Tranche A's return is calculated as the first $2 million of the profits, as well as a pro-rata share of the remaining $38 million ($38 million*10%=$3.8 million). Thus, tranche A's return when the fund returns 40% is $2 million+$3.8 million=5.8 million, or 58% of tranche A's capital.

When the fund returns 40% ($40 million on the $100 million of tranches A and B collectively), tranche B's return is 38%. Tranche B does not participate in the first $2 million of the profits, but receives a pro-rata share of the remaining $38 million ($38 million*90%=$34.2 million. Thus, tranche B's return when the fund returns 40% is 34.2 million, or 38% of tranche B's capital.

When the fund returns 40%, investor 1's return is ($5 million in tranche A)*(58% tranche A return)+($5 million in tranche B)*(38% tranche B return)=$4.8 million, or 48%.

When the fund returns 40%, investor 2's return is ($2 million in tranche A)*(58% tranche A return)+($8 million in tranche B)*(38% tranche B return)=$4.2 million, or 42%.

Embodiments of the present invention may provide to investors an investment product including any number of tranches, each tranche with its own tranche risk profile for allocation of risk on the collective investment across all of the number of tranches. It will be appreciated that any number of investors may invest in the fund, each investor creating an investor risk profile by allocating the investor's investment between the tranches and directly investing in the fund. Thus, an investor may specifically tailor a risk/reward profile to suit the investor's unique needs.

FIG. 2A illustrates possible returns of a replicated first tranche of an investment asset according to an example embodiment of the present invention. A structured investment product as discussed may have a readily determined value according to financial theory. For example, the tranches discussed in FIG. 1 may be financially equivalent to a portfolio of investments in the fund and combinations of European-style call and put options on the fund. The options would be set to expire at the end of the two year term of the investment. The fund value may start, for example, at $100 per share, which is used to calculate appropriate tranche pricing.

Thus, the tranches may be replicated as an equivalent set of options, thereby allowing pricing of the tranches with existing option pricing theory. As discussed below, the tranches of FIG. 1 are replicated as a set of options and long positions in the investment fund. The set of options will produce the same final returns as the tranches as defined in FIG. 1 for any hypothetical return of the investment fund, and are thus equivalent.

For example, tranche A may be analogous to a set of positions having a $10 million initial value, and consisting of the following components, which may include a long position in the fund as well as a set of call and put options on the fund:
  Long $10 million fund;
  Long $100 million Put at $90;
  Short $90 million Call at $102;
  Long $90 million Call at $100; and
  Short $90 million Put at $100.

Table 200 depicts returns of tranche A components for various hypothetical returns. The first column of the table depicts final returns 202 of the fund. Depicted final return columns 204, 206, 208 and 210 are hypothetical returns of the fund.

Row 212 depicts the final value of the $10 million position in the fund at the various hypothetical fund returns. Row 214 depicts the final value of the long $100 million@90 put at the various hypothetical fund returns. Row 216 depicts the final value of the short $90 million@100 call at the various hypothetical fund returns. Row 218 depicts the final value of the short $90 million@102 call at the various hypothetical fund returns. Row 210 depicts the final value of the long $100 million@100 call at the various hypothetical fund returns.

For example, with respect to column 204, if the fund's return is −20%, the ending share value of the fund is $80/share. The long $10 million in the fund is worth $8 million (loss of $2 million on $10 million tranche capital). However, the long $100 million@90 put options will be worth $10 million (($90−$80)/share*1 million options). The short $90 million@100 put options will be worth −$18 million (($80−$100)/share*900,000 options). The remaining components, i.e., short $90 million @ 102 call and long $90 million@100 call, expire worthless. Thus, tranche A has a value of $0 at the expiration of the options.

It will be appreciated that while tranche A has zero capital remaining, it does not owe additional capital. All outstanding liabilities are offset by gains in certain options. It is possible to structure the option components so that a tranche's exposure is limited to the initial capital.

It will be appreciated that the underlying fund may be a passively managed investment fund, such as an index fund, or a fixed portfolio of investments, in addition to being an actively managed investment fund.

Figure 2B:
FIG. 2B is a table that shows possible returns of a second tranche of an investment asset, according to an example embodiment of the present invention.

FIG. 2B illustrates possible returns of a replicated second tranche of an investment asset according to an example embodiment of the present invention. Similar to FIG. 2A, FIG. 2B depicts a portfolio of investments in the fund and combinations of European-style call and put options on the fund financially equivalent to tranche B discussed with respect to FIG. 1.

For example, tranche B may be analogous to a set of positions having a $90 million initial value, and consisting of the following components, which may include a long position in the fund as well as a set of call and put options on the fund:

Long $90 million fund;
Short $100 million Put at $90;
Long $90 million Call at $102;
Short $90 million Call at $100; and
Long $90 million Put at $100.

Table 250 depicts returns of tranche B components for various hypothetical returns. The first column of the table depicts final returns 252 of the fund. Depicted final return columns 254, 256, 258 and 260 are hypothetical returns of the fund.

Row 262 depicts the final value of the $90 million position in the fund at the various hypothetical fund returns. Row 264 depicts the final value of the short $100 million@90 put at the various hypothetical fund returns. Row 266 depicts the final value of the long $90 million@100 put at the various hypothetical fund returns. Row 268 depicts the final value of the long $90 million@102 call at the various hypothetical fund returns. Row 270 depicts the final value of the short $90 million@100 call at the various hypothetical fund returns.

For example, with respect to column 254, if the fund's return is −20%, the ending share value of the fund is $80/share. The long $90 million in the fund is worth $72 million (loss of $18 million on $90 million tranche capital). The short $100 million@90 put options will be worth −$10 million (($80−90)/share*1 million options). The long $90 million @ 100 put options will be worth $18 million (($100−$80)/share*900,000 options). The remaining components long $90 million@102 call and short $90 million@100 call expire worthless. Thus, tranche B has a value of $80 at the expiration of the options.

It will be appreciated that the options of tranche A and tranche B cancel out into a simple long position of $100 million in the fund when combined. Thus, the fund and the tranches are a self-contained package, and investors may directly purchase and sell options to each other. No external marketplace is necessary for this structured investment product. In addition, the investors or new investors may purchase component optons of tranches A and B from each other during the life of the fund, even if the underlying fund is illiquid.

It will be appreciated that tranches A and B may be priced as a sum of their component options and long positions. By determining financially equivalent portfolios of the tranches as discussed above, financial theory such as the Black-Scholes formula may be used to calculate an appropriate price for each tranche.

Tranches A and B may be valued with various methods, such as Black-Scholes, stochastic volatility models, models with mean-reversion or jump-diffusion processes, or other pricing models. This may require a forecast of the volatility of the underlying investment, and optionally a forecast of the skew, kurtosis, or "fat tails" of the return probability distribution of the underlying investment. It will be appreciated that if the value of the options in each tranche sum to zero, the investors of each tranche are on an equal initial position without the necessity of a premium payment between the tranches.

Analyzing the above tranches with the Black Scholes formula for European-style equity call and put values, a price X may be calculated at which each tranche's net option value is zero. This price is $102.00, assuming an annualized volatility of 9.8217% for the investment fund returns a risk free interest rate of 5.25% and a 2 year investment term. Thus, a fair priority upside percentage participation for tranche A, as calculated by Black-Scholes, is 20%, or $2 million on the tranche A capital of $10 million.

In one embodiment, an annualized volatility could be estimated as equaling the previous historical or back tested performance of the fund. The relative size of the tranches, and the amount of downside protection, could be determined according to investor demand and risk appetite through the use of an auction process, such as a Dutch auction or a dynamic pari-mutuel auction.

FIG. 3 illustrates possible returns of tranches with various risk profiles according to an embodiment of the present invention. Different risk profiles of tranches A and B are depicted, and various returns of the tranches are calculated for hypothetical fund returns.

Tranche A capital 300 depicts the amount of capital accepted into tranche A.

Tranche B capital 302 depicts the amount of capital accepted into tranche B.

Tranche A downside detachment point 304 depicts the maximum amount of loss, calculated as a percentage of the loss in the underlying investment, to be suffered by tranche A, in case of a loss by the fund. Columns 300, 302, and 304 are given inputs. Tranche A priority upside percentage 306 depicts the percentage return that tranche A will receive before any profits are distributed to tranche B, in case of a profit by the fund. Columns 320-344 may be accordingly calculated.

Rows 308-318 depict various risk profiles of tranches A and B, varying the amount of capital in each tranche, the maximum loss to be suffered by trance A, and the priority upside percentage of trance A.

Columns 320-344 depict various hypothetical returns of the fund, and associated returns of tranche A and tranche B. For each tranche risk profile discussed above, the first row depicts the tranche A return and the second row depicts the tranche B return.

For example, with respect to the risk profile associated with the tranche A return 342 and tranche B return 344, tranche A is shown to provide $30 million of capital and tranche B is shown to provide $70 million of capital. Tranche A may suffer a maximum 100% of loss. In addition, tranche A receives the first $2.622 million of the profits (8.74% tranche A priority upside percentage*$30 million tranche A capital). Tranche A and tranche B returns are depicted in rows 342 and 344 for various hypothetical fund returns.

The tranche A priority upside detachment point (or cap) 306 may be calculated based on the tranches' risk profiles. For example, it may be calculated by option pricing theory, such as Black Scholes, so that an initial net value of options embedded in tranche A and tranche B is zero in each scenario. The assumptions used in this option valuation are: underlying annualized volatility 9.8217%, 2 year term, risk free interest rate of 5.25%, and European exercise type.

Setting the initial net value of the options to zero removes any initial bias or preference for one tranche over the other, and eliminates the need for premium payments between the tranches. The fair value tranche A priority upside percentage 306 may vary due to dynamically changing (stochastic) volatility, return probability skew and kurtosis, etc.

In an example embodiment, where an investment product includes two tranches A and B, the value of the tranche A priority upside detachment point strike price $K_1$ can be calculated as a function of the initial underlying asset price, the tranche A and B capital, and the tranche A detachment point $L_m$ as:

$$-C(K_1) \cdot b/S_0 + P(K_3) \cdot (a+b)/S_0 + C(K_2) \cdot b/S_0 - P(K_2) \cdot b/S_0 = 0, \quad (1.1)$$

defined as follows. $C(K_n)$ and $P(K_n)$ are the call and put values respectively (in dollars) as computed by the chosen option valuation model as functions of the strike price arguments $K_n$, where the following are set to chosen constants: $S_0$=underlying asset price (in dollars) at the initial time of the investment; a=tranche A investment capital (in dollars); b=tranche B investment capital (in dollars); $K_2$ is both the tranche A priority upside attachment point strike price and downside attachment point strike price, and is set equal to $S_0$; and $K_3$=the chosen lower limit (floor) of the underlying asset price to which tranche A is exposed. $K_3$ may be further defined by:

$$K_3 = S_0(1 - L_m), \quad (1.2)$$

where $L_m$=tranche A downside detachment point (maximum loss floor) as a fraction of the total underlying capital, where $0 < L_m \leq 1$.

Further, the tranche A priority upside detachment point may equal $U_a$, where $$U_a = (K_1/S_0 - 1) \text{ and } U_a > 0. \quad (1.3)$$

By the definitions above, $K_1 > K_2 > K_3$.

Once a suitable option valuation model is chosen, this expression can be solved for $K_1$ numerically by a general-purpose root-finding algorithm, such as the method of bisection, Newton's method, or the method of secants. Then, once $K_1$ is known, $U_a$ may be obtained by solving equation (1.3).

For example, with respect to the embodiment shown in FIG. 3, the Black-Scholes model for valuation of European-exercise option values may be used to determine the values shown in column 306 as a function of the values in columns 300, 302, and 304 as follows.

The standard Black-Scholes formula may be applied for a non-dividend paying stock as follows:

$$C(S_0, K, r, T, \sigma) = S_0 N(d_1) - K e^{-rT} N(d_2) \quad (1.4)$$

$$P(S_0, K, r, T, \sigma) = K e^{-rT} N(-d_2) - S_0 N(-d_1)$$

where:

$$d_1 = \frac{\ln(S_0/K) + (r + \sigma^2/2)T}{\sigma\sqrt{T}}$$

$$d_2 = d_1 - \sigma\sqrt{T},$$

and where N( ) is the cumulative normal distribution function, C( ) and P( ) are the call and put option values, respectively, in dollars, $\sigma$=estimated annualized volatility of the underlying asset, T=term of tranche investment in years (option expiry), r=annualized risk free return rate, K=strike price, and $S_0$=initial price of underlying asset per share.

With these values and applying equation (1.4) to equation (1.1) above:

$$-C(K_1) + W(S_0, L_m, r, T, \sigma, a, b) = 0, \quad (1.5)$$

where:

$$W(S_0, L_m, r, T, \sigma, a, b) = \frac{(a+b)}{b} \cdot P(S_0 \cdot [1 - L_m]) + C(S_0) - P(S_0) \quad (1.6)$$

or:

$$S_0 N(d_1) - K_1 e^{-rT} N(d_2) - W(S_0, L_m, r, T, \sigma, a, b) = 0, \quad (1.7)$$

where $$d_1 = \frac{\ln(S_0/K_1) + (r + \sigma^2/2)T}{\sigma\sqrt{T}}; d_2 = d_1 - \sigma\sqrt{T}.$$

According to these values, the value of W( ) above will be a constant, since the variables upon which it depends are given as constants. In the example shown in FIG. 3, the following values are used: $S_0$=100; T=2 years, $\sigma$=9.8217%; r=5.25%; a=the tranche A capital as given in column 300; b=the tranche B capital as given in column 302; and $L_m$ is the tranche A maximum loss fraction as given in percentage terms in column 304. From equation (1.3), the value of $U_A$, the tranche A upside priority detachment point for a given $K_1$ may be determined.

In order to apply the bisection method to find the root of (1.5), two starting values of $K_1$ are needed, ($K^+$) producing any positive value and ($K^-$) producing any negative value for the left hand side of equation (1.5). Just one example of such a pair of starting values could be, in the case of FIG. 3, $$K^+ = S_0[1 + 2 \cdot L_m]; K^- = S_0. \quad (1.8)$$

Applying the method of bisection, the root of (1.5) (i.e., the value of $K_1$ which solves (1.5)) is found for each set of inputs. For each such $K_1$, equation (1.3) gives the resulting values $U_A$ in column 306 of FIG. 3, expressed as a percentage.

The return $R_a$ for tranche A for the example of equation (1.5) is defined by the following expression:

$$R_a \equiv \frac{(V_a - a)}{a}, \quad (1.9)$$

where $V_a$=final value of tranche A at the end of the term, and a=tranche A initial capital investment in dollars.

For tranche A, this is given by:

$$R_a = \quad (1.10)$$

$$(\max\{-L_m \cdot (a+b), \min[(S_T - S_0) \cdot (a+b)/S_0, K_1 \cdot (a+b)/S_0]\} +$$

$$\max[(S_T - K_1) \cdot a/S_0, 0])/a,$$

where $S_T$=the price of the underlying investment at end of the term T. $K_1$ is the tranche A upside attachment point strike price as defined previously in equation (1.1).

It follows that the return $R_b$ for tranche B for the example of equation (1.5) is given by the following:

$$R_b = (\min[(S_T - K_3) \cdot (a+b)/S_0, 0] + \max[(S_T - K_1) \cdot b/S_0, 0])/b, \quad (1.11)$$

where $K_3$ is the lower strike price as defined in equation (1.2).

Also, because the total profits (losses) from all tranches must equal the total profit (loss) of the related investment in the underlying fund, the tranche B return can also be expressed as a function of the underlying fund return $R_S$, tranche a return $R_a$, tranche A capital a, and tranche B capital b:

$$R_b = [R_s \cdot (a+b) - R_a \cdot a]/b, \quad (1.12)$$

where $R_s = (S_T - S_0)/S_0$.

Figure 4:
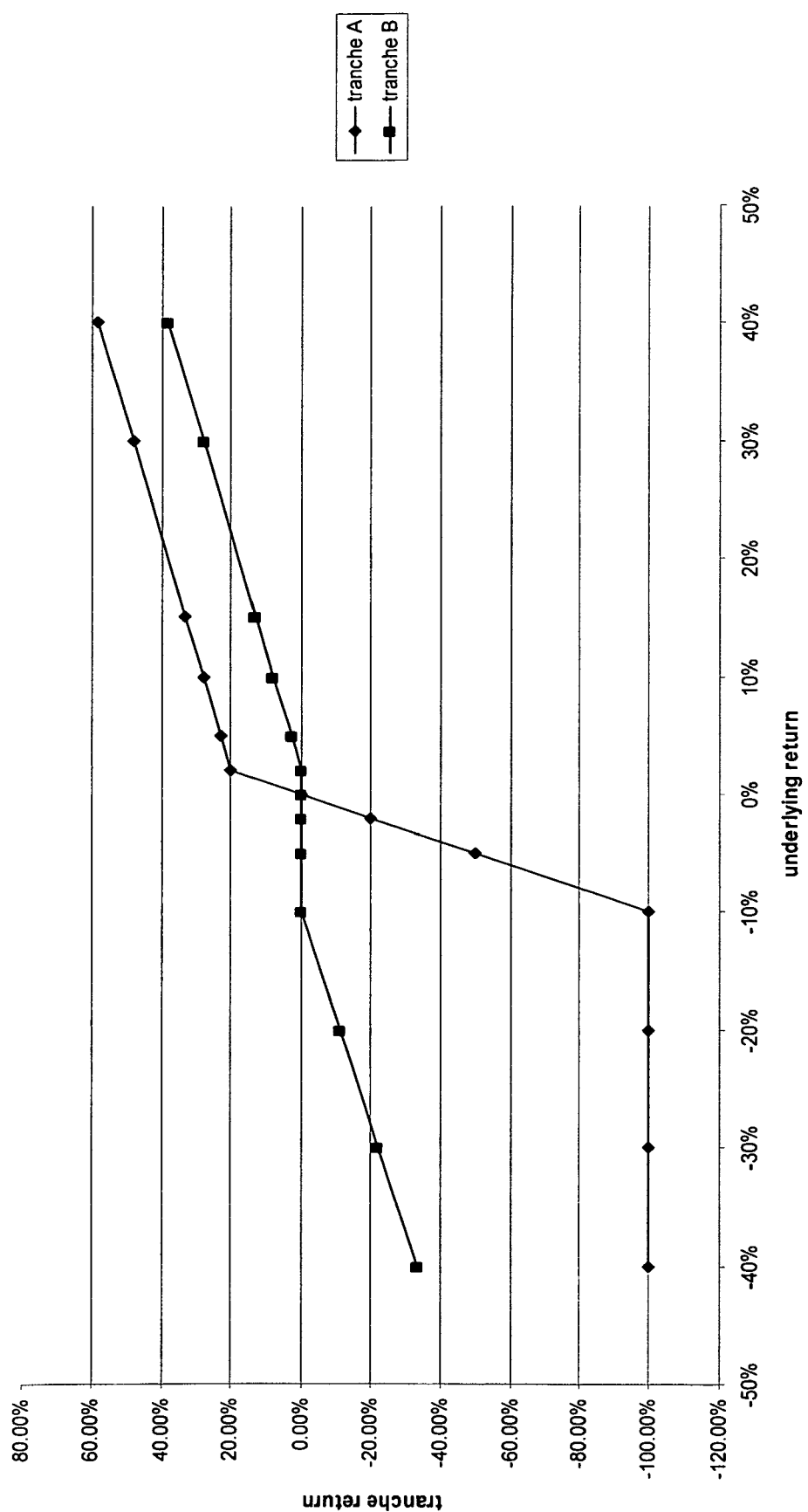
FIG. 4 is a graph that shows a comparison of returns of two tranches of an investment product, according to an example embodiment of the present invention.

A graph of the results of equations (1.11) and (1.12) is shown in FIG. 4, in the case where a=$10 million, b=$90 million, $S_0$=$100 million, $L_m$=10%, and, since $U_a$=2%, $K_1$=102.

An alternative embodiment generalizes the packages of replicated options to include an initial payment of cash from tranche A to tranche B, in compensation for additional priority upside participation or for reduced downside protection. Alternatively, this initial payment can be from tranche B to tranche A, in compensation for reduced priority upside or increased downside protection. For example, formula (1.1) can be extended to this more general case, adding g as the initial cash payment in dollars from tranche B to tranche A, and the equation to be solved becomes:

$$-C(K_1)b + P(K_2)(a+b) + C(K_3)b - P(K_3)b + g \cdot S_0 = 0. \quad (1.13)$$

In another embodiment, an upside attachment participation fraction, h, may be defined, where $0 < h \leq 1$, which allows for a smaller upside attachment percentage of the underlying fund's profits to be allocated to tranche A. This generalization yields:

$$-C(K_1) \cdot b \cdot h + P(K_2)(a+b) + C(K_3) \cdot b \cdot h - P(K_3)b + g \cdot S_0 = 0. \quad (1.14)$$

It then follows directly from (1.15) and above that:

$$-C(K_1) + W(S_0, L_m, r, T, \sigma, a, b, g, h) = 0, \quad (1.15)$$

where:

$$W(S_0, L_m, r, T, \sigma, a, b, g, h) = \frac{(a+b)}{b \cdot h} \cdot P(S_0 \cdot [1 - L_m]) + C(S_0) - \frac{P(S_0)}{h} + \frac{g \cdot S_0}{b \cdot h}. \quad (1.16)$$

g can be positive or negative. g will be negative where tranche A initially pays cash to tranche B. One can obtain the previous examples of embodiments given above by using h=1 and g=0.

Once again, W( ) given in equation (1.17) becomes a constant when $S_0$, $L_m$, r, T, σ, a, b, g, h are given as constants, and equation (1.16) is then solved by a root-finding algorithm in a similar way to the method describe above.

The return $R_a$ for tranche A for the example of equation (1.16) is given by the following expression:

$$R_a = [g + \max\{-L_m \cdot a, \min[(S_T - S_0) \cdot (a+b)/S_0, K_1 \cdot (a+b)/S_0]\} + \max[(S_T - K_1) \cdot a/S_0, 0]]/(a-g). \quad (1.17)$$

It follows that the return $R_b$ for tranche B is given by the following:

$$R_b = (g - \min[(S_T - K_3) \cdot (a+b)/S_0, 0] + \max[(S_t - K_1) \cdot b/S_0, 0])/(b+g). \quad (1.18)$$

Example results of this are shown in the table of FIG. 5, which includes rows 508-518 corresponding to rows 308-318 of FIG. 3, and columns 500-504, 506, and 520-542 corresponding to columns 300-304, 306, and 320-342 of FIG. 3, and additional column 505 showing example amounts of initial cash tranche B pays to tranche A.

One can also solve equation (1.16) in cases where $K_1$ is held constant, and another single variable in the set ($S_0$, $L_m$, r, T, σ, a, b, g, h) is allowed to vary.

Figure 6:
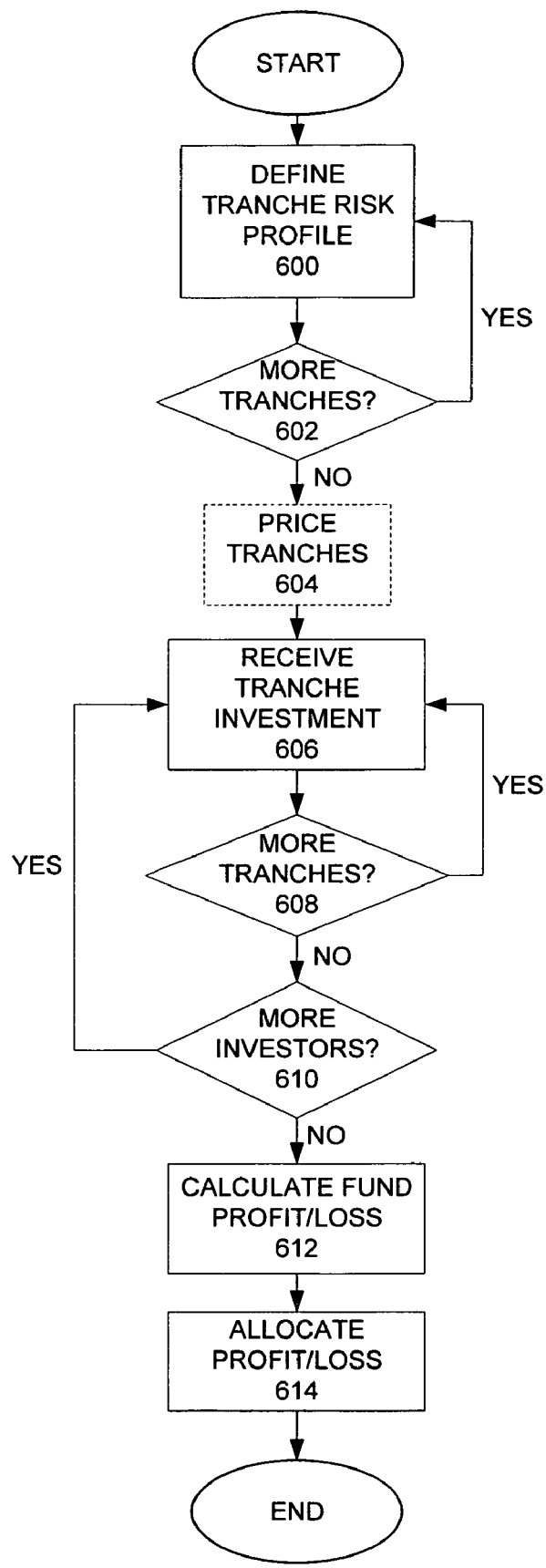
FIG. 6 is a flowchart that illustrates a method for monitoring investments in an investment fund, according to an example embodiment of the present invention.
Figure 8:
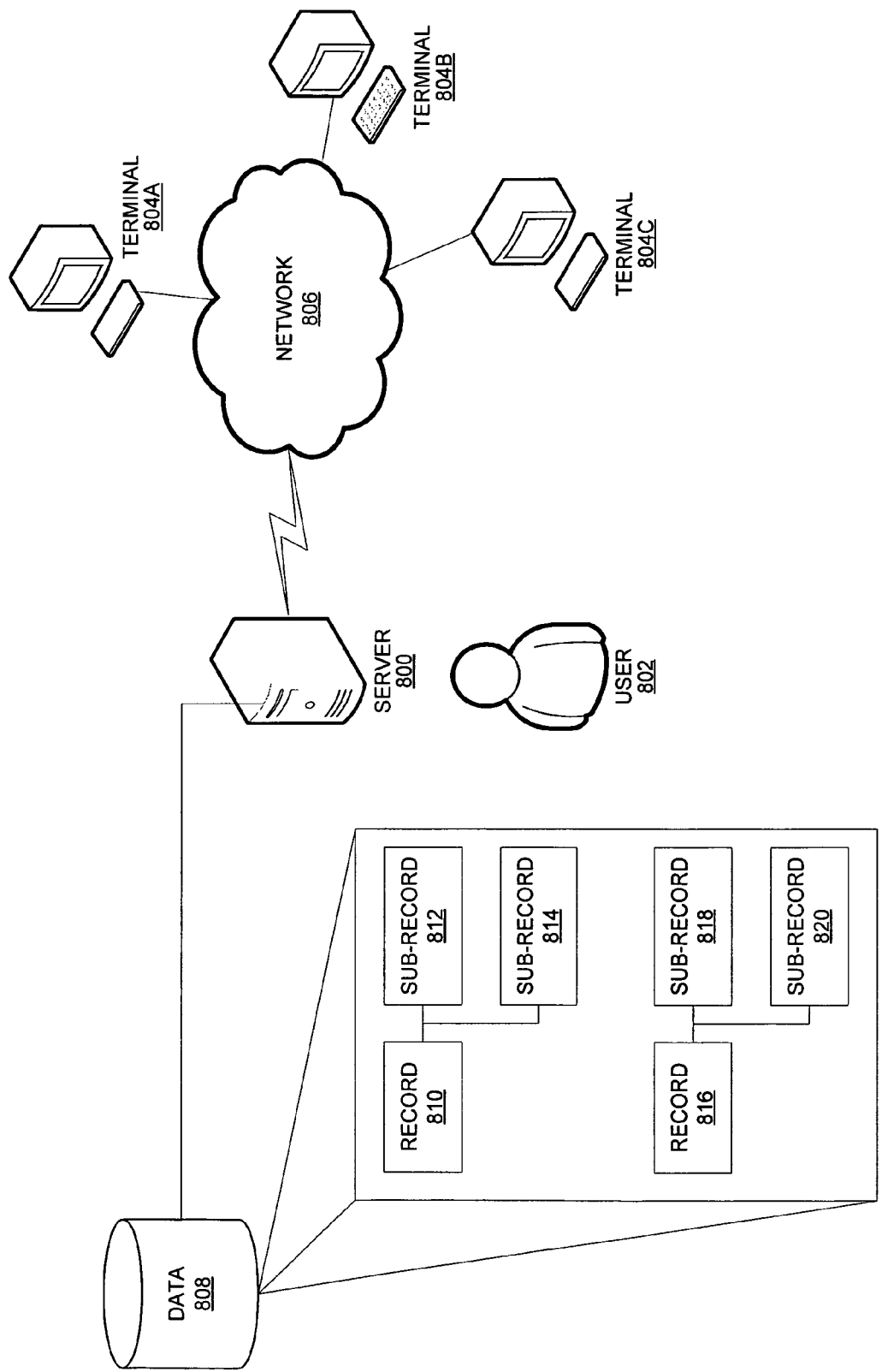
FIG. 8 is a diagram that illustrates a system for providing a plurality of tranches in an investment fund, according to an example embodiment of the present invention.

FIG. 6 illustrates a method for monitoring investments in an investment fund according to an embodiment of the present invention. The method may execute on a server of a system as depicted in FIG. 8, discussed below.

In 600, a user may define a tranche risk profile. The fund may include at least two tranche risk profiles. Each risk profile may be defined as discussed above. Tranche risk profiles may include characteristics such as amount of initial capital, caps on profits and losses, participation in profits and losses, and profits and losses priority.

For example, the user may be a portfolio or fund manager of the fund. Alternatively, the user may be responsible for setting up the structure of the fund and take no part in day-to-day trading of the fund.

As discussed above, an investment product may include two or more tranches. In 602, the server may determine to proceed again to 600 if there are more tranches to be defined. After all the tranches have been defined, the server may proceed to 604.

In 604, the server may price the tranches. As discussed above, the tranches may be priced in a variety of ways, including auction or as an equivalent portfolio of options using standard option pricing models.

In 606, the user may input a tranche investment amount from an investor. As discussed above, an investor may invest in one or more tranches. Information relating to an investor may be stored in a record, and tranche investment for each investor may be stored in a sub-record. The records and sub-records may be stored in a data store accessible to the server.

In 608, the server may determine to proceed again to 606 if there are more tranches to receive investments. Otherwise, the method may proceed to 610.

In 610, the server may determine to proceed again to 606 there are more users to receive investments from. Otherwise, the method may proceed to 612.

After investor investments in tranches are determined, the portfolio manager may manage the fund. For example, the portfolio manager may trade securities in the fund, attempting to make a profit on the initial investment.

In 612, the server may calculate a fund profit or loss. This may occur at a predetermined interval during the life of the fund, for example, at the end of every trading day or at the end of every quarter. The fund profit or loss may be calculated by determining the total gain or loss of the fund from the initial investment.

In 614, the profit or loss may be allocated to the different tranches based on the tranche risk profiles, as described above. For example, profits and losses may be first allocated to a riskier tranche, while a less risky tranche may participate to a lesser extent any profits and losses of the fund.

Figure 7:
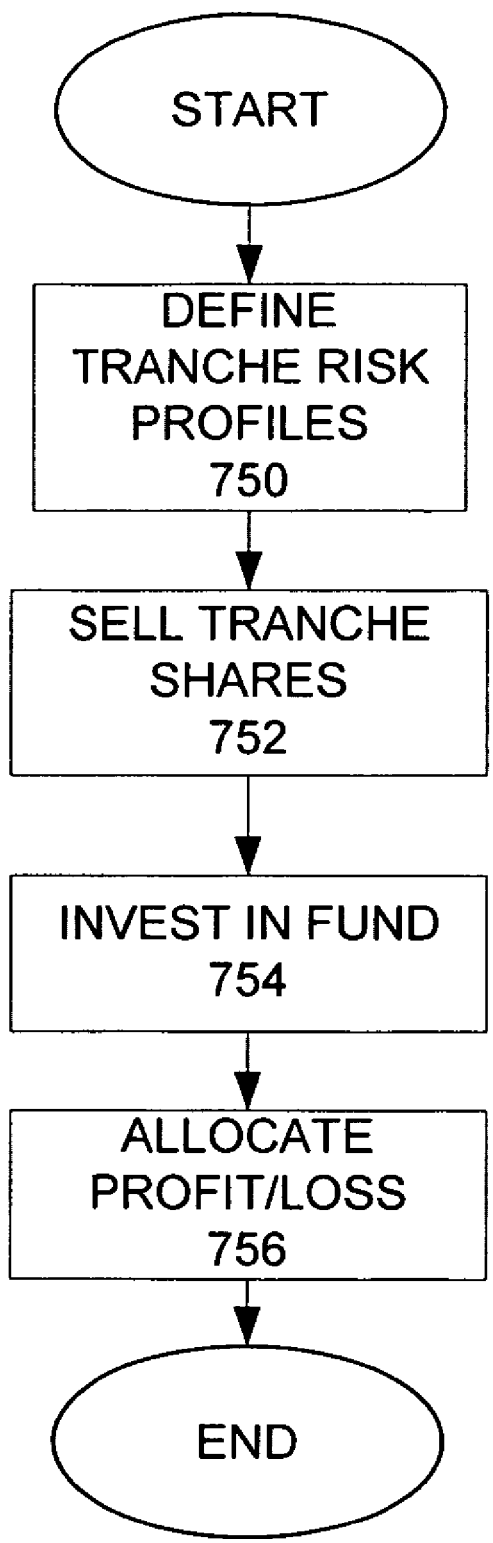
FIG. 7 is a flowchart that illustrates a second method for monitoring investments in an investment fund, according to an example embodiment of the present invention.

FIG. 7 illustrates a second method for investing in an investment fund according to an embodiment of the present invention. Some steps of the method illustrated in FIG. 7 may be similar to the method illustrated in FIG. 6.

In 750, a fund manager or other entity may define tranche risk profiles. A plurality of tranches may be defined, each tranche associated with a tranche risk profile. A tranche risk profile may be as described above.

In 752, shares in each of the tranches may be sold to investors. For example, tranches may be priced as an equivalent options portfolio using existing financial theory and calculations. Alternatively, tranches may be priced by offering them in an auction to investors. Investor demand would then price the tranches.

In 754, the proceeds from the sale in 752 may be used to invest in at least one investment fund. Investment funds may include securities and other assets, as discussed above.

In 756, the server may allocate a profit or a loss resulting from the investment in the investment fund to the various tranches, as discussed above.

FIG. 8 illustrates a system for providing a plurality of tranches in an investment fund according to an embodiment of the present invention. A server 800 may execute a software program to perform the calculations and recordkeeping required by the system. The software program may include a set of instructions on a computer readable medium such as ROM, RAM, a rewritable medium, etc. For example, recordkeeping may include allocating profits and losses of the fund among the investors. A user 802, for example, a portfolio manager, may access the server 800 to perform trades on behalf of the fund.

The server 800 may be in communication with other entities via network 806, for example, the Internet. The network 806 may be an encrypted or otherwise secured network. The network 806 may provide access to brokers with whom the user 802 may place trades on behalf of the fund and provide access to information sources such as news and securities research. Terminals 804A, 804B, and 804C may also access the server 800 over the network 806.

The server 800 may be in communication with a data store 808, for example, stored in a rewritable random access memory. The data store 808 may include representations and descriptions of the tranches and investors as discussed above, and/or other associated data.

Data Store 808 may include a first record 810 and a second record 816. For example, each record may store information regarding a respective investor. Each investor may invest in each tranche offered by the fund. It will be appreciated that an investor's investment in a specific tranche may be $0.

Investor A's investments in tranche A may be stored in a sub-record 812, and investor A's investment in tranche B may be stored in sub-record 814. Investor B's investments in tranche A may be stored in sub-record 818, and investor B's investments in tranche B may be stored in sub-record 820.

It will be appreciated that the tranche risk profiles may be stored in data store 808, and used by the server 800 to calculate each investor's return.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, combinations, variations or equivalents that fall within the scope of the basic underlying principals disclosed and claimed herein.

I claim:

1. A computer-implemented method, comprising:
at a central computer:
    storing data that represents a plurality of tranches of an investment product having different risk profiles with respect to a same investment fund;
    recording, by a processor, sales of the plurality of tranches to each of a plurality of investors in the investment product;
    receiving from the investors respective investment amounts; and
    for each of at least one of the investors, recording, by the processor, an assignment of shares in at least two of the plurality of tranches to the investor,
    wherein:
        for the each of the at least one investor, the respective investment amount of the investor is allocated to the at least two tranches by selecting an investment amount in each of the at least two tranches in accordance with at least one of: amounts specified by received instructions; and percentages specified by the instructions; and
        an aggregate investment amount of the investor in all of the at least two tranches provides a risk/reward profile that is customized for the investor.

2. A computer-implemented method, comprising:
at a central computer:
    storing data that represents a plurality of tranches of an investment product having different risk profiles with respect to a same investment fund;
    recording, by a processor, sales of the plurality of tranches to each of a plurality of investors in the investment product;
    receiving from the investors respective investment amounts; and
    for each of at least one of the investors, recording, by the processor, an assignment of shares in at least two of the plurality of tranches to the investor;
    wherein each tranche risk profile includes at least one of a priority upside attachment point for attaching to a priority segment in which to receive a greater than pro-rata share of return than other attached tranches, a priority upside participation percentage of less than 100%, a pro-rata upside attachment point for detaching from the priority segment, a priority upside detachment point, a priority downside attachment point, and a downside participation percentage.

3. A computer-implemented method, comprising:
at a central computer:
    storing data that represents a plurality of tranches of an investment product having different risk profiles with respect to a same investment fund;
    recording, by a processor, sales of the plurality of tranches to each of a plurality of investors in the investment product;
    receiving from the investors respective investment amounts;
    for each of at least one of the investors, recording, by the processor, an assignment of shares in at least two of the plurality of tranches to the investor; and
    determining a priority upside detachment point strike price $K_1$ for a first one of the plurality of tranches based on an initial underlying asset price, investment capital of the plurality of tranches, and a downside detachment point $L_m$ of the first tranche by computing $-C(K_1)\cdot b/S_0+P(K_3)\cdot(a+b)/S_0+C(K_2)\cdot b/S_0-P(K_2)\cdot b/S_0=0$, wherein:
$C(K_1)$, $C(K_2)$, and $C(K_3)$ are call values determined in accordance with a chosen option valuation model as a function of strike price arguments $K_1$, $K_2$, and $K_3$, respectively;
$P(K_1)$, $P(K_2)$, and $P(K_3)$ are put values determined in accordance with the chosen option valuation model as a function of the strike price arguments $K_1$, $K_2$, and $K_3$, respectively;
$S_0$ is the initial underlying asset price;
a is the capital of the first tranche;
b is the capital of a second one of the plurality of tranches;
strike price argument $K_2$ equals $S_0$; and
strike price argument $K_3$ is equal to $S_0(1-L_m)$.

4. The method of claim 2, wherein a loss in the investment fund is first allocated to a higher downside priority tranche and a profit in the investment fund is first allocated to a higher upside priority.

5. The method of claim 2, wherein an allocation of loss to a tranche is limited to the downside detachment point of the tranche.

6. The method of claim 2, wherein a loss in the investment fund is allocated between the tranches based on each tranche's downside percentage and a profit in the investment fund is allocated based on each tranche's upside percentage.

7. A computer-implemented method, comprising:
at a central computer:
storing data that represents a plurality of tranches of an investment product having different risk profiles with respect to a same investment fund;
recording, by a processor, sales of the plurality of tranches to each of a plurality of investors in the investment product;
receiving from the investors respective investment amounts;
for each of at least one of the investors, recording, by the processor, an assignment of shares in at least two of the plurality of tranches to the investor;
representing each of the tranches as a combination of European-style options; and
calculating, by the processor, a price of each tranche using a pricing technique applied to the combination of European-style options.

8. A computer-implemented method, comprising:
at a central computer:
storing data that represents a plurality of tranches of an investment product having different risk profiles with respect to a same investment fund;
recording, by a processor, sales of the plurality of tranches to each of a plurality of investors in the investment product;
receiving from the investors respective investment amounts;
for each of at least one of the investors, recording, by the processor, an assignment of shares in at least two of the plurality of tranches to the investor; and
calculating an initial value associated with each tranche based on each respective tranche risk profile.

9. The method of claim 1, further comprising:
calculating a profit/loss return for the investor at an end of a predetermined period based on the investment amount positions, the tranche risk profiles of the at least two tranches and a performance of the investment fund.

10. A computer-implemented method, comprising:
at a central computer:
storing data that represents a plurality of tranches of an investment product having different risk profiles with respect to a same investment fund;
recording, by a processor, sales of the plurality of tranches to each of a plurality of investors in the investment product;
receiving from the investors respective investment amounts; and
for each of at least one of the investors, recording, by the processor, an assignment of shares in at least two of the plurality of tranches to the investor,
wherein the allocating includes selecting an investment amount in each tranche in accordance with a requested customized risk/reward profile specified by the instructions, an aggregate investment amount of the investor in all of the at least two tranches providing the requested customized risk/reward profile.

11. A computer-implemented method, comprising:
at a central computer:
storing data that represents a plurality of tranches of an investment product having different risk profiles with respect to a same investment fund;
recording, by a processor, sales of the plurality of tranches to each of a plurality of investors in the investment product;
receiving from the investors respective investment amounts;
for each of at least one of the investors, recording, by the processor, an assignment of shares in at least two of the plurality of tranches to the investor; and
responsive to an investor purchase during an illiquid period, reallocating an investment in a tranche from a first investor to a second investor.

12. A computer-implemented investment method, comprising:
selling to a plurality of investors in an investment product shares of each of a plurality of tranches of the investment product, the tranches having different assigned risk profiles;
for each of the plurality of tranches, receiving for the sale of its shares a respective monetary sum;
investing a total of the monetary sums as a single investment in at least one investment fund;
at a central computer, recording an assignment of shares in at least two of the plurality of tranches to a single one of the investors; and
allocating, by a computer processor, one of a profit and a loss resulting from the investment in the at least one fund to the plurality of tranches in accordance with the assigned risk profiles and in a manner disproportionate to respective percentages of the total to which the respective monetary sums correspond.

13. The investment method of claim 12, further comprising:
calculating initial values of the shares based on a set of European-style call and put options that is equivalent to the plurality of tranches.

14. A computer system controlling investments in an investment fund by an investor, comprising:
a memory, the memory configured to store:
data representing a plurality of tranche risk profiles of a respective plurality of tranches, each associated with a same investment fund; and
for an investor, at least two records, each record (a) indicating a respective position of an investment amount of the investor and (b) associated with a different respective one of the plurality of tranche risk profiles; and a processor configured to calculate a profit/loss for the investor based on the investment amount positions, the tranche risk profiles and a performance of the investment fund.

15. The system of claim 14, wherein a return is calculated as the profit/loss for the investor at an end of a predetermined period.

16. The system of claim 14, wherein each tranche risk profile includes at least one of a priority upside attachment point, an upside attachment point, a priority upside participation percentage, a pro-rata upside attachment point, a priority upside detachment point, a priority downside attachment point, a downside detachment point, and a downside participation percentage.

17. The system of claim 16, wherein a loss in the investment fund is first allocated to a higher downside priority tranche and a profit in the investment fund is first allocated to a higher upside priority.

18. The system of claim 16, wherein a loss of a tranche is limited to the tranche's downside cap.

19. The system of claim 16, wherein a loss in the investment fund is allocated between the tranches based on each tranche's downside percentage and a profit in the investment fund is allocated based on each tranche's upside percentage.

20. The system of claim 16, wherein each of the tranches is represented in the computer as a combination of European-style options, and wherein a price of each tranche is calculated using a pricing technique applied to the combination of European-style options.

21. The system of claim 16, the processor further configured to calculate an initial value associated with each tranche based on the tranche risk profile of the respective tranche.

22. The system of claim 16, the processor further configured to select an investment amount in each tranche, where an aggregate investment amount in all the tranches provides a customized risk/reward profile requested by the investor.

23. A computer-readable medium having stored thereon instructions adapted to be executed by a processor, the instructions which when executed cause the processor to perform an investment method, the investment method comprising:

storing definitions of a plurality of tranches of an investment product having different risk profiles with respect to a same investment fund, the definitions defining the different risk profiles;

recording an assignment of shares in at least two of the plurality of tranches to a single investor, wherein the recording includes allocating to each of the at least two of the plurality of tranches a respective portion of an investment amount of the single investor in the investment product; and calculating a profit/loss for the investor based on the investment amount portions, the risk profiles defined by the respective definitions of the at least two tranches, and a performance of the investment fund.

24. A computer-implemented method, comprising:
at a central computer:

storing data that represents a plurality of tranches of an investment product having different risk profiles with respect to a same investment fund;

recording, by a processor, sales of the plurality of tranches to each of a plurality of investors in the investment product;

receiving from the investors respective investment amounts; and for each of at least one of the investors, recording, by the processor, an assignment of shares in at least two of the plurality of tranches to the investor, wherein a first one of the plurality of tranches differs from a second one of the plurality of tranches with respect to at least one of:

a priority upside attachment point, a priority upside participation percentage, a pro-rata upside attachment point, a priority upside detachment point, a priority downside attachment point, and a downside participation percentage.

25. A computer-implemented investment method, comprising:

storing data that defines a plurality of tranches of an investment product having different risk profiles with respect to a same investment fund;

recording respective investment amounts in the plurality of tranches for each of a plurality of investors in the investment product; and receiving from the investors respective investment amounts; and determining, by a computer processor, a priority upside detachment point strike price $K_1$ for a first one of the plurality of tranches based on an initial underlying asset price, investment capital of the plurality of tranches, and a downside detachment point $L_m$ of the first tranche by computing $-C(K_1) \cdot b/S_0 + P(K_3) \cdot (a+b)/S_0 + C(K_2) \cdot b/S_0 - P(K_2) \cdot b/S_0 = 0$, wherein:

$C(K_1)$, $C(K_2)$, and $C(K_3)$ are call values determined in accordance with a chosen option valuation model as a function of strike price arguments $K_1$, $K_2$, and $K_3$, respectively;

$P(K_1)$, $P(K_2)$, and $P(K_3)$ are put values determined in accordance with the chosen option valuation model as a function of the strike price arguments $K_1$, $K_2$, and $K_3$, respectively;

$S_0$ is the initial underlying asset price;

a is the capital of the first tranche;

b is the capital of a second one of the plurality of tranches;

strike price argument $K_2$ equals $S_0$; and strike price argument $K_3$ is equal to $S_0(1-L_m)$.

26. The method of claim 10, further comprising:

calculating a profit/loss return for the investor at an end of a predetermined period based on the investment amount positions, the tranche risk profiles of the at least two tranches and a performance of the investment fund.

* * * * *